(12) United States Patent
Kim et al.

(10) Patent No.: US 11,384,180 B2
(45) Date of Patent: Jul. 12, 2022

(54) POLYPROPYLENE AND METHOD FOR PREPARING THE SAME

(71) Applicant: LG Chem, Ltd., Seoul (KR)

(72) Inventors: Taejin Kim, Daejeon (KR); Seong Min Chae, Daejeon (KR); Kyung Seop Noh, Daejeon (KR); Sang Jin Jeon, Daejeon (KR); In Yong Jung, Daejeon (KR)

(73) Assignee: LG Chem, Ltd.

( * ) Notice: Subject to any disclaimer, the term of this patent is extended or adjusted under 35 U.S.C. 154(b) by 634 days.

(21) Appl. No.: 16/464,871

(22) PCT Filed: Oct. 1, 2018

(86) PCT No.: PCT/KR2018/011638
§ 371 (c)(1),
(2) Date: May 29, 2019

(87) PCT Pub. No.: WO2019/103306
PCT Pub. Date: May 31, 2019

(65) Prior Publication Data
US 2020/0140583 A1 May 7, 2020

(30) Foreign Application Priority Data

Nov. 27, 2017 (KR) .................. 10-2017-0159736
Sep. 28, 2018 (KR) .................. 10-2018-0116448

(51) Int. Cl.
| | | |
|---|---|---|
| C08F 110/06 | (2006.01) | |
| C08F 4/643 | (2006.01) | |
| C08F 4/659 | (2006.01) | |
| C08F 4/6592 | (2006.01) | |
| C07F 17/00 | (2006.01) | |
| A47L 13/16 | (2006.01) | |
| D04H 1/4291 | (2012.01) | |
| D04H 3/007 | (2012.01) | |

(52) U.S. Cl.
CPC ............. *C08F 110/06* (2013.01); *A47L 13/16* (2013.01); *C07F 17/00* (2013.01); *C08F 4/643* (2013.01); *C08F 4/65912* (2013.01); *C08F 4/65916* (2013.01); *C08F 4/65927* (2013.01); *D04H 1/4291* (2013.01); *D04H 3/007* (2013.01); *D10B 2321/022* (2013.01)

(58) Field of Classification Search
CPC ................................................... C08F 110/06
See application file for complete search history.

(56) References Cited

U.S. PATENT DOCUMENTS

| | | | |
|---|---|---|---|
| 8,030,426 | B2 | 10/2011 | Fuchs et al. |
| 2006/0116490 | A1 | 6/2006 | Paczkowski et al. |
| 2009/0017710 | A1 | 1/2009 | Bugada et al. |
| 2009/0137739 | A1 | 5/2009 | Fuchs et al. |
| 2009/0259009 | A1 | 10/2009 | Fuchs et al. |
| 2015/0031844 | A1 | 1/2015 | Lee et al. |
| 2016/0208028 | A1 | 7/2016 | Choi et al. |
| 2016/0251460 | A1 | 9/2016 | Noh et al. |
| 2016/0257703 | A1 | 9/2016 | Park et al. |

FOREIGN PATENT DOCUMENTS

| | | |
|---|---|---|
| CN | 101124252 A | 2/2008 |
| CN | 101291986 A | 10/2008 |
| CN | 105555811 A | 5/2016 |
| EP | 3572441 A1 | 11/2019 |
| JP | 2001163771 A | 6/2001 |
| JP | 2007145914 A | 6/2007 |
| JP | 2008522013 A | 6/2008 |
| JP | 2008302503 A | 12/2008 |
| JP | 2009512751 A | 3/2009 |
| JP | 2009525375 A | 7/2009 |
| JP | 2011231328 A | 11/2011 |
| KR | 20070092217 A | 9/2007 |
| KR | 20150037652 A | 4/2015 |
| KR | 20150037653 A | 4/2015 |
| KR | 20150052803 A | 5/2015 |
| KR | 20160045433 A | 4/2016 |
| KR | 20170001384 A | 1/2017 |
| KR | 20170046461 A | 5/2017 |
| KR | 20170059668 A | 5/2017 |
| KR | 20180051222 A | 5/2018 |
| WO | 2007088204 A2 | 8/2007 |
| WO | 2009054833 A2 | 4/2009 |
| WO | 2011042364 A1 | 4/2011 |
| WO | 2012016928 A1 | 2/2012 |
| WO | 2013066109 A1 | 5/2013 |

OTHER PUBLICATIONS

Chinese Search Report for Application No. 201880005191.7 dated Jun. 3, 2021, 3 pages.
Extended European Search Report including Written Opinion for Application No. EP18881653.2 dated Feb. 26, 2020, 9 pgs.
Report No. 4364 of the Naval Research 10 Laboratories, published May 25, 1954 entitled "Manufacture of Superfine Organic Fibers".
International Search Report for PCT/KR2018/011638 dated Jan. 16, 2019.

*Primary Examiner* — Catherine S Branch
(74) *Attorney, Agent, or Firm* — Lerner, David, Littenberg, Krumholz & Mentlik, LLP

(57) ABSTRACT

The present invention provides a homopolypropylene having high strength and a low content of low molecular weights together with excellent processability, and a preparation method thereof.

14 Claims, No Drawings

POLYPROPYLENE AND METHOD FOR PREPARING THE SAME

CROSS-REFERENCE TO RELATED APPLICATION(S)

The present application is a national phase entry under 35 U.S.C. § 371 of International Application No. PCT/KR2018/011638 filed Oct. 1, 2018, which claims priority from Korean Patent Application No. 10-2017-0159736 filed Nov. 27, 2017 and Korean Patent Application No. 10-2018-0116448 filed Sep. 28, 2018, all of which are incorporated herein by reference.

The present invention relates to a polypropylene having high strength and a low content of low molecular weights together with excellent processability, and a preparation method thereof.

BACKGROUND ART

An olefin polymerization catalyst system can be classified into a Ziegler-Natta catalyst system and a metallocene catalyst system, and these two high activity catalyst systems have been developed in accordance with each characteristic. A Ziegler-Natta catalyst has been widely applied to the conventional commercial process since it was invented in the 1950s, however, since it is a multi-site catalyst in which multiple active sites are mixed, the catalyst is characterized in that a polymer has a broad molecular weight distribution, and since a comonomer has a non-uniform composition distribution, the catalyst has a problem in that there is a limitation in securing desired physical properties.

Meanwhile, a metallocene catalyst is composed of a combination of a main catalyst which has a transition metal compound as a main component and a cocatalyst which is an organometallic compound having aluminum as a main component. This catalyst which is a homogeneous complex catalyst is a single site catalyst, has a narrow molecular weight distribution due to the characteristic of a single site catalyst, produces a polymer in which the composition distribution of the comonomer is uniform, and is characterized in that the tacticity, the copolymerization properties, the molecular weight, the crystallinity, or the like of the polymer may be changed depending on modification of a ligand structure of the catalyst and a change of polymerization conditions.

Usually, when a homopolypropylene prepared with a Ziegler-Natta catalyst, which is used for a disposable scrubber, is allowed to have higher strength or a lower basis weight, there is a problem in that the physical properties thereof are deteriorated, and also the processability thereof is deteriorated. In addition, since a disposable scrubber manufactured with a Ziegler-Natta catalyst has a higher content of low molecular weights due to higher content of xylene solubles and a broader molecular weight distribution than a homopolypropylene prepared with a metallocene catalyst, the scrubber has a soft surface to be inappropriate for use as a scrubber when applied.

In order to compensate for the drawbacks, a method in which a polypropylene having a melt index (MI) of 230 g/10 min, conventionally produced by the Ziegler-Natta catalyst, is blended with an additive to pull out thick fiber having rough tactility (feel) to be used has been suggested, however, the polypropylene prepared with the Ziegler-Natta catalyst and the polypropylene composition blended with the additive has poor spinnability to produce nonuniform fiber, which causes physical properties to be deteriorated. In addition, since dry blending→thermal processing→pelletizing→second processing→producing a product are continued, there is a drawback of incurring high processing costs.

DISCLOSURE

Technical Problem

The present invention has been made in an effort to provide a homopolypropylene having advantages of high strength and a low content of low molecular weights together with excellent processability, and a preparation method thereof, by using a metallocene catalyst having a specific structure instead of a Ziegler-Natta catalyst.

Technical Solution

An exemplary embodiment of the present invention provides a homopolypropylene satisfying the following conditions:
  i) a melt index of 200 to 2000 g/10 min (as measured at 230° C. under a load of 2.16 kg according to ASTM D1238),
  ii) a molecular weight distribution of 3.3 or less,
  iii) a residual stress ratio of 0.05% or less, and
  iv) a xylene soluble content of 1.0 wt % or less.

Another embodiment of the present invention provides a preparation method of the homopolypropylene, including adding 700 to 2500 ppm of hydrogen in the presence of a catalyst composition including a compound of the following Chemical Formula 1 to polymerize a propylene monomer:

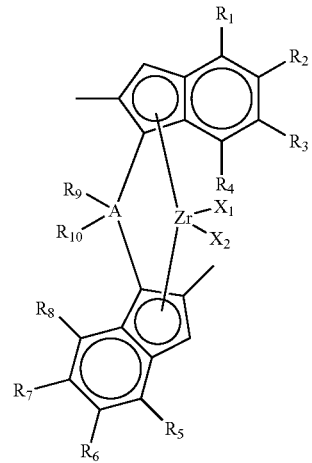

[Chemical Formula 1]

wherein
A is carbon, silicon, or germanium,
$X_1$ and $X_2$ are independently a halogen,
$R_1$ and $R_5$ are independently a $C_{6-20}$ aryl substituted with a $C_{1-20}$ alkyl,
$R_2$ to $R_4$ and $R_6$ to $R_8$ are independently hydrogen, a halogen, a $C_{1-20}$ alkyl, a $C_{2-20}$ alkenyl, a $C_{1-20}$ alkylsilyl, a $C_{1-20}$ silylalkyl, a $C_{1-20}$ alkoxysilyl, a $C_{1-20}$ ether, a $C_{1-20}$ silyl ether, a $C_{1-20}$ alkoxy, a $C_{6-20}$ aryl, a $C_{7-20}$ alkylaryl, or a $C_{7-20}$ arylalkyl, and
$R_9$ and $R_{10}$ are identical to each other and are a $C_{2-20}$ alkyl.

Yet another embodiment of the present invention provides a resin composition for non-woven fabric, including the homopolypropylene, a non-woven fabric manufactured using the composition, and more specifically a non-woven fabric for washing such as a scrubber.

Advantageous Effects

The homopolypropylene according to the present invention has a low residual stress ratio, a low content of xylene solubles, a melt index in an optimum range, and a narrow molecular weight distribution, thereby representing excellent processability, and allows manufacture of a fiber having a thin and uniform thickness and manufacture of a high-stiffness and low-basis weight non-woven fabric. In addition, the homopolypropylene may impart rougher tactility than existing products, while simultaneously implementing excellent stiffness, so that the fiber is not easily torn even with high strength. Accordingly, the homopolypropylene may be useful for manufacture of a non-woven fabric, in particular a non-woven fabric for washing such as a scrubber.

MODE FOR INVENTION

The terms used in the present specification are only for illustrating exemplary embodiments, and are not intended to limit the present invention. An expression of a singular form includes an expression of a plural form, unless the context clearly indicates otherwise. In the present specification, the term, "comprise", "include", or "have" should be understood as specifying the presence of practiced features, steps, constitutional elements, or a combination thereof, but not precluding the possibility of presence or addition of one or more of other features, steps, constitutional elements, or a combination thereof.

Since the present invention may be variously modified and may have various forms, specific exemplary embodiments will be illustrated and described in detail in the following. However, it should be understood that the exemplary embodiments are not intended to limit the invention to a specific disclosed form, and cover all modifications, equivalents, and alternatives falling within the sprit and technical scope of the invention.

Hereinafter, a homopolypropylene and a preparation method thereof according to specific embodiments of the present invention will be described.

For compensating the physical properties of a disposable scrubber which was conventionally manufactured with a Ziegler-Natta catalyst, in the present invention, propylene is polymerized under the condition of adding a controlled content of hydrogen using a metallocene catalyst as described below, to prepare a homopolypropylene which has a narrow molecular weight distribution and low residual stress, whereby fiber having a thin and uniform thickness may be manufactured, resulting in the manufacture of high-stiffness and low-basis weight non-woven fabric. In addition, since the prepared homopolypropylene has a low content of low molecular weights, due to the narrow molecular weight distribution and low xylene solubles, the homopolypropylene may provide a rough feeling to the surface, and as a result, when applied to a non-woven fabric for washing, the homopolypropylene may improve a washing effect. In addition, since there is no need to blend the homopolypropylene with an additive, a non-woven fabric may be manufactured with only primary processing, thereby improving processability.

Specifically, a homopolypropylene according to an embodiment of the present invention satisfies the following conditions:

i) a melt index of 200 to 2000 g/10 min (as measured at 230° C. under a load of 2.16 kg according to ASTM D1238),
ii) a molecular weight distribution of 3.3 or less,
iii) a residual stress ratio of 0.05% or less, and
iv) a xylene soluble content of 1.0 wt % or less.

More specifically, the homopolypropylene according to an embodiment of the present invention has a melt index (MI) of 200 to 2000 g/10 min as measured at 230° C. under a load of 2.16 kg according to ASTM D1238. The MI is adjustable depending on an amount of hydrogen to be added during a polymerization process, and the homopolypropylene according to the present invention has an MI in a range as described above considering the requirements of physical properties of ii) to iv), thereby improving a balance between spinnability and strength of a non-woven fabric. In particular, in processing a non-woven fabric using the homopolypropylene, when the MI is less than 200 g/10 min, processing pressure may be raised to deteriorate processability, and when the MI is more than 2000 g/10 min, it is hard to implement high strength of the non-woven fabric to be manufactured. In addition, in order to manufacture a polypropylene having an MI value in the above range, in the case of using the Ziegler-Natta catalyst, a high content of hydrogen should be added in a polymerization step, however, by using the catalyst including a metallocene compound as described below, a relatively low content of hydrogen may be added, whereby controlling activity is easy and process stability is increased. Considering excellence of the effect of improving spinnability and strength of the non-woven fabric, the homopolypropylene may have an MI of 220 to 1500 g/10 min.

In addition, the homopolypropylene according to an embodiment of the present invention has a narrow molecular weight distribution (MWD=Mw/Mn) of 3.3 or less, together with the MI as described above. By having such a narrow molecular weight distribution, the non-woven fabric manufactured therefrom may represent excellent stiffness. More specifically, the homopolypropylene may have an MWD of 1.5 to 3.3, and more specifically 2.5 to 3.3.

Meanwhile, in the present invention, the molecular weight distribution (MWD) may be determined by a ratio (Mw/Mn) of a weight average molecular weight (Mw) to a number average molecular weight (Mn), after using gel permeation chromatography (PC) to measure the weight average molecular weight and the number average molecular weight. Specifically, the measurement may be performed using a Waters PL-GPC220 instrument using a PLgel Mixed-B column of a 300 mm length from Polymer Laboratories, wherein an evaluation temperature is 160° C., a solvent is 1,2,4-trichlorobenzene, and a flow rate is 1 mL/min. In addition, a sample is prepared at a concentration of 10 mg/10 mL, and supplied in an amount of 200 μL. A calibration curve formed by using a polystyrene standard was used to derive Mw and Mn values. The molecular weight (g/mol) of the polystyrene standard was nine types of 2000/10,000/30,000/70,000/200,000/700,000/2,000,000/4,000,000/10,000,000.

In addition, the homopolypropylene according to an embodiment of the present invention has a low residual stress ratio of 0.05% or less, together with the MI and MWD as described above.

The residual stress ratio is to confirm fiber processability by a rheological physical property test under a circumstance similar to a non-woven fabric manufacturing process, and may be obtained by carrying out a stress relaxation test in which a large strain is applied to the homopolypropylene, and performing calculation from the thus-measured residual stress value according to the following Equation 1:

Residual stress ratio=$(RS_1/RS_0) \times 100$   Equation 1 wherein $RS_0$ is residual stress at any one point ($t_0$) within 0.05 s after applying a strain at 200% to the homopolypropylene at 235° C., and $RS_1$ is residual stress at any one point ($t_1$) between 0.05 s and 1.50 s after applying a strain at 200% to the homopolypropylene at 235° C.

In addition, in Equation 1, $RS_0$ represents residual stress immediately (for example, any one point ($t_0$) within 0.05 s) after applying a strain at 200% to the homopolypropylene at 235° C. Further, in Equation 1, $RS_1$ represents residual stress within about 1.5 s (for example, any one point ($t_1$) between 0.05 s and 1.50 s) after $t_0$ under the same condition as $RS_0$.

Specifically, in Equation 1, $t_0$ may be selected from 0.01 s, 0.015 s, 0.02 s, 0.025 s, 0.03 s, 0.035 s, 0.04 s, and 0.045 s. Further, in Equation 1, $t_1$ may be selected from 0.05 s, 0.10 s, 0.20 s, 0.30 s, 0.40 s, 0.50 s, 0.60 s, 0.70 s, 0.80 s, 0.90 s, 1.00 s, 1.10 s, 1.20 s, 1.30 s, 1.40 s, and 1.50 s. Preferably, for easily securing effective data when measuring residual stress, it may be advantageous that $t_0$ is 0.02 s, and $t_1$ is 1.00 s in Equation 1.

In addition, the residual stress ratio of the homopolypropylene is measured under the similar circumstance to the process condition for performing melt blowing when manufacturing a non-woven fabric (e.g., at 235° C.). The temperature of 235° C. corresponds to the appropriate temperature for completely melting a homopolypropylene composition and performing melt blowing.

Usually, a non-woven fabric is manufactured by spinning a resin in a molten state into fiber, and performing a stretching process in a semi-molten state while cooling. Here, when the residual stress ratio according to Equation 1 is high, which is more than 0.05%, high resistance to strain is represented, and thus spinnability is not good in a spinning process, whereby it is difficult to manufacture a fiber having a thin and uniform thickness. In addition, since a single yarn occurrence rate is high, processability is deteriorated, for example, the time during which the fiber is not produced due to single yarn occurrence in a fiber producing process is prolonged, and it is difficult to continuously perform a spinning process. In addition, since web formability is poor, strength may be deteriorated.

However, since the homopolypropylene according to the present invention has a low residual stress ratio of 0.05% or less, manufacture of a fiber having a thin and uniform thickness is possible, and manufacture of a high-stiffness and low-basis weight non-woven fabric is possible with excellent processability.

Considering the effect of improving fiber processability by controlling a residual stress ratio, the residual stress ratio of the homopolypropylene may be more specifically 0.005 to 0.05%, and still more specifically 0.005 to 0.03%, or 0.02 to 0.03%.

In addition, the homopolypropylene represents high tacticity which is a content of xylene solubles (Xs) of 1.0 wt % or less.

In the present invention, the xylene solubles are a content (wt %) of polymers soluble in cooled xylene, which is determined by dissolving the homopolypropylene in xylene and crystallizing insolubles from the cooled solution, and the xylene solubles contain polymer chains having low tacticity. The lower the content of the xylene solubles, the higher the tacticity. As the homopolypropylene according to an embodiment of the present invention has such a high tacticity, the manufactured non-woven fabric may represent excellent stiffness. Considering the excellence of the improvement effect by controlling the xylene solubles, the xylene solubles of the homopolypropylene may be more specifically 0.5 to 1.0 wt %, and still more specifically 0.6 to 0.7 wt %.

In addition, in the present invention, the xylene solubles may be measured by adding xylene to a homopolypropylene sample, which is pretreated by heating at 135° C. for 1 hour and then cooling for 30 minutes, flowing xylene for 4 hours at a flow rate of 1 mL/min in OmniSec equipment (FIPA from Viscotek), and when base lines of RI (refractive index), DP (pressure across middle of bridge), and IP (inlet pressure through bridge top to bottom) are stabilized, recording the concentration of the pretreated sample and the injection amount and performing measurement, and calculating a peak area.

In addition, together with the MI, MWD, residual stress ratio, and xylene soluble conditions as described above, the homopolypropylene may have a melting point (Tm) of 150 to 155° C., and more specifically 152 to 154° C. When the homopolypropylene has the Tm in the above range, it may represent excellent spinnability and productivity.

Meanwhile, in the present invention, the melting point may be measured using a differential scanning calorimeter (DSC) (manufactured by TA Instruments). Specifically, the temperature of the homopolypropylene is increased to 200° C., maintained at that temperature for 5 minutes, decreased to 30° C., and then increased again, thereby measuring the melting point as the peak of a DSC curve. Here, a temperature increase rate and a temperature decrease rate are 10° C./min, respectively, and the melting point is a result measured at a second temperature increase section.

The homopolypropylene having the above physical properties according to an embodiment of the present invention may be prepared by a preparation method including adding 700 to 2500 ppm of hydrogen based on a total weight of a propylene monomer, in the presence of a catalyst composition including a compound of Chemical Formula 1 as a catalytic active component, to polymerize the propylene monomer:

[Chemical Formula 1]

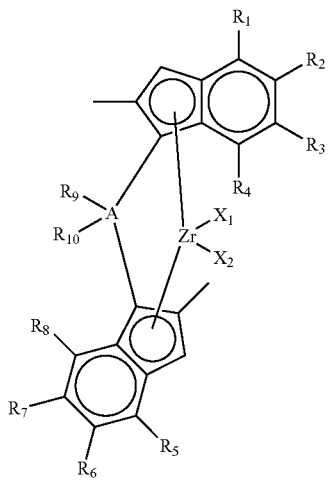

wherein

A is carbon, silicon, or germanium, $X_1$ and $X_2$ are independently a halogen, $R_1$ and $R_5$ are independently a $C_{6-20}$ aryl substituted with a $C_{1-20}$ alkyl, $R_2$ to $R_4$ and $R_6$ to $R_8$ are independently hydrogen, a halogen, a $C_{1-20}$ alkyl, a $C_{2-20}$ alkenyl, a $C_{1-20}$ alkylsilyl, a $C_{1-20}$ silylalkyl, a $C_{1-20}$ alkoxysilyl, a $C_{1-20}$ ether, a $C_{1-20}$ silyl ether, a $C_{1-20}$ alkoxy, a $C_{6-20}$ aryl, a $C_{7-20}$ alkylaryl, or a $C_{7-20}$ arylalkyl, and $R_9$ and $R_{10}$ are identical to each other and are a $C_{2-20}$ alkyl.

In the present specification, the following terms may be defined as follows, unless otherwise particularly stated.

The halogen may be fluorine (F), chlorine (Cl), bromine (Br), or iodine (I).

The $C_{1-20}$ alkyl group may be a linear, branched, or cyclic alkyl group. Specifically, the $C_{1-20}$ alkyl group may be a $C_{1-15}$ linear alkyl group, a $C_{1-10}$ linear alkyl group, a $C_{1-5}$ linear alkyl group, a $C_{3-20}$ branched or cyclic alkyl group, a $C_{3-15}$ branched or cyclic alkyl group, or a $C_{3-10}$ branched or cyclic alkyl group. More specifically, the $C_{1-20}$ alkyl group may be a methyl group, an ethyl group, an n-propyl group, an iso-propyl group, an n-butyl group, an iso-butyl group, a tert-butyl group, an n-pentyl group, an iso-pentyl group, a neo-pentyl group, a cyclohexyl group, or the like.

The $C_{2-20}$ alkenyl group may be a linear, branched, or cyclic alkenyl group. Specifically, the $C_{2-20}$ alkenyl group may be a $C_{2-20}$ linear alkenyl group, a $C_{2-10}$ linear alkenyl group, a $C_{2-5}$ linear alkenyl group, a $C_{3-20}$ branched alkenyl group, a $C_{3-15}$ branched alkenyl group, a $C_{3-10}$ branched alkenyl group, a $C_{5-20}$ cyclic alkenyl group, or a $C_{5-10}$ cyclic alkenyl group. More specifically, the $C_{2-20}$ alkenyl group may be an ethenyl group, a propenyl group, a butenyl group, a pentenyl group, a cyclohexenyl group, or the like.

The $C_{6-30}$ aryl may refer to a monocyclic, bicyclic, or tricyclic aromatic hydrocarbon. Specifically, the $C_{6-30}$ aryl may be a phenyl group, a naphthyl group, an anthracenyl group, or the like.

The $C_{7-30}$ alkylaryl may refer to a substituent group in which one or more hydrogens of aryl are substituted by alkyl. Specifically, the $C_{7-30}$ alkylaryl may be methylphenyl, ethylphenyl, n-propylphenyl, iso-propylphenyl, n-butylphenyl, iso-butylphenyl, tert-butylphenyl, cyclohexylphenyl, or the like.

The $C_{7-30}$ arylalkyl may refer to a substituent group in which one or more hydrogens of alkyl are substituted by aryl. Specifically, the $C_{7-30}$ arylalkyl may be a benzyl group, a phenylpropyl, a phenylhexyl, or the like.

A catalyst composition used in the preparation of the homopolypropylene according to an embodiment of the present invention includes the compound of Chemical Formula 1 as a single catalyst. Accordingly, the molecular weight distribution of the prepared homopolypropylene may be significantly narrower as compared with the case of mixing two or more catalysts.

Moreover, the compound of Chemical Formula 1 which is a bridge group connecting two ligands containing an indenyl group contains a divalent functional group A disubstituted with identical alkyl groups having 2 or more carbon atoms, thereby increasing an atom size, and as the compound has an increased available angle, approach to a monomer is easy so that better catalytic activity may be represented.

In addition, both indenyl groups as ligands are substituted by a methyl group at the 2-position and contain an aryl group substituted by an alkyl, respectively, at the 4-position ($R_1$ and $R_5$), thereby representing better catalytic activity by an inductive effect to supply sufficient electrons.

In addition, the compound of Chemical Formula 1 contains zirconium (Zr) as a central metal, thereby having more orbitals to accept electrons as compared with the case of containing other Group 14 elements such as Hf, and thus the compound may be easily bonded to the monomer with higher affinity, and as a result, may represent a better effect of improving catalytic activity.

More specifically, in the above Chemical Formula 1, $R_1$ and $R_5$ may independently be a $C_{6-12}$ aryl group substituted with a $C_{1-10}$ alkyl, and more specifically, a phenyl group substituted with a $C_{3-6}$ branched alkyl group such as tert-butyl phenyl. In addition, the substitution position of the alkyl group to the phenyl group may be the 4-position corresponding to a para position to a $R_1$ or $R_5$ position bonded to an indenyl group.

In addition, in the above Chemical Formula 1, $R_2$ to $R_4$ and $R_6$ to $R_8$ may independently be hydrogen, and $X_1$ and $X_2$ may independently be chloro.

Further, in the above Chemical Formula 1, A may be silicon (Si), and $R_9$ and $R_{10}$ as substituents of A are identical to each other in terms of improving supporting efficiency, and may be a $C_{2-10}$ alkyl group, more specifically a $C_{2-4}$ linear alkyl group, and even more specifically ethyl, respectively. As such, the compound has alkyl groups that are identical to each other as the substituent group to A of the bridge group, whereby the problem that when the substituent group to the element of the bridge group was conventionally a methyl group having one carbon atom, solubility when preparing a supported catalyst was poor to deteriorate supporting reactivity, may be solved.

A representative example of the compound represented by Chemical Formula 1 is as follows.

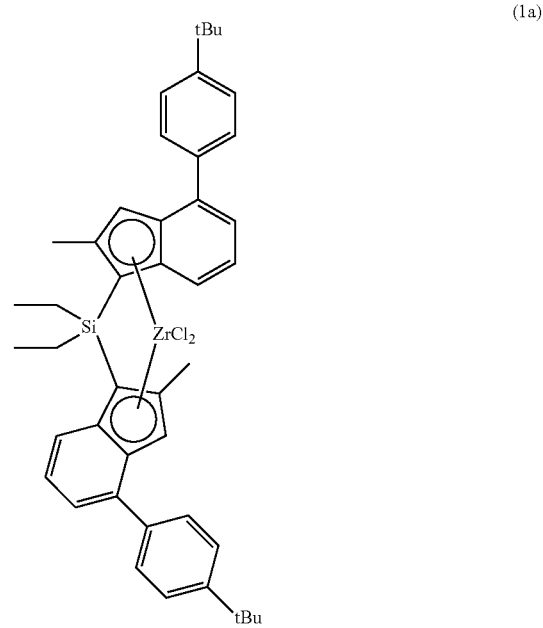

(1a)

The compound of Chemical Formula 1 may be synthesized by applying known reactions, and for a more detailed synthesis method, preparation examples as described below may be referred to.

Meanwhile, the compound of Chemical Formula 1 may be used as a single component, or may be used in a supported catalyst state of being supported by a carrier.

As the carrier, one having a hydroxy group or a siloxane group having high reactivity on the surface may be used, and a carrier which is dried to remove moisture on the surface may be used. For example, silica, silica-alumina, silica-magnesia, and the like which are dried at a high temperature may be used, and these may usually contain components of oxides, carbonates, sulfates, and nitrates such as $Na_2O$, $K_2CO_3$, $BaSO_4$, and $Mg(NO_3)_2$.

The temperature at which the carrier is dried may be 200 to 800° C., or 300 to 600° C., or 300 to 400° C. When the drying temperature is too low, moisture remaining in the carrier is excessive so that the moisture on the surface may react with a cocatalyst, and when the drying temperature is too high, pores on the carrier surface are combined to decrease a surface area, and many hydroxy groups on the surface are lost so that only siloxane groups are left, whereby reaction sites with the cocatalyst may be decreased.

As an example, an amount of the hydroxy group on the carrier surface may be 0.1 to 10 mmol/g or 0.5 to 5 mmol/g. The amount of the hydroxy group on the carrier surface may be adjusted by the preparation method and preparation conditions or drying conditions of the carrier, for example, temperature, time, vacuum or spray drying, or the like. When the amount of the hydroxy group is too small, the number of reaction sites with the cocatalyst is small, and when the amount is too large, the hydroxy group may result from the moisture other than the hydroxy group present on the carrier particle surface.

In addition, when the compound of Chemical Formula 1 is supported by the carrier, a weight ratio of the compound of Chemical Formula 1 to the carrier may be 1:1 to 1:1000. When the carrier and the compound of Chemical Formula 1 are included at the weight ratio, an appropriate supported catalytic activity is represented, thereby being advantageous in terms of catalytic activity, maintenance, and economic feasibility. More specifically, the weight ratio of the compound of Chemical Formula 1 to the carrier may be 1:10 to 1:30, and more specifically 1:15 to 1:20.

In addition, the catalyst composition may further include a cocatalyst in terms of having high activity and improving process stability, in addition to the compound of Chemical Formula 1 and the carrier. The cocatalyst may include one or more of compounds represented by the following Chemical Formula 2, Chemical Formula 3, or Chemical Formula 4:

  [Chemical Formula 2]

wherein each $R_{11}$ is identical to or different from each other and is independently a halogen, a $C_{1-20}$ hydrocarbon, or a $C_{1-20}$ hydrocarbon substituted with halogen, and m is an integer of 2 or more;

  [Chemical Formula 3]

wherein each $R_{12}$ is identical to or different from each other and is independently a halogen, a $C_{1-20}$ hydrocarbon, or a $C_{1-20}$ hydrocarbon substituted with a halogen, and J is aluminum or boron; and

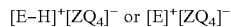  [Chemical Formula 4]

wherein

E is a neutral or cationic Lewis base,

H is a hydrogen atom,

Z is a Group 13 element, and each Q is identical to or different from each other and is independently a $C_{6-20}$ aryl group or a $C_{1-20}$ alkyl group in which one or more hydrogen atoms are unsubstituted or substituted with a halogen, a $C_{1-20}$ hydrocarbon, an alkoxy, or a phenoxy.

An example of the compound represented by Chemical Formula 2 may include methylaluminoxane, ethylaluminoxane, isobutylaluminoxane, butylaluminoxane, or the like, and more specifically methylaluminoxane.

An example of the compound represented by Chemical Formula 3 may include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminummethoxide, trimethylboron, triethylboron, triisobutylboron, tripropylboron, tributylboron, or the like, and more specifically may be selected from trimethylaluminum, triethylaluminum, and triisobutylaluminum.

In addition, an example of the compound represented by Chemical Formula 4 may include triethylammonium tetraphenylboron, tributylammonium tetraphenylboron, trimethylammonium tetraphenylboron, tripropylammonium tetraphenylboron, trimethylammonium tetra(p-tolyl)boron, trimethylammonium tetra(o,p-dimethylphenyl)boron, tributylammonium tetra(p-trifluoromethylphenyl)boron, trimethylammonium tetra(p-trifluoromethylphenyl)boron, tributylammonium tetrapentafluorophenylboron, N,N-diethylanilinium tetraphenylboron, N,N-diethylanilinium tetrapentafluorophenylboron, diethylammonium tetrapentafluorophenylboron, triphenylphosphonium tetraphenylboron, trimethylphosphonium tetraphenylboron, triethylammonium tetraphenyl aluminum, tributylammonium tetraphenyl aluminum, trimethylammonium tetraphenyl aluminum, tripropylammonium tetraphenyl aluminum, trimethylammonium tetra(p-tolyl)aluminum, tripropylammonium tetra(p-tolyl)aluminum, triethylammonium tetra(o,p-dimethylphenyl)aluminum, tributylammonium tetra(p-trifluoromethylphenyl)aluminum, trimethylammonium tetra (p-trifluoromethylphenyl)aluminum, tributylammonium tetrapentafluorophenyl aluminum, N,N-diethylanilinium tetraphenyl aluminum, N,N-diethylanilinium tetrapentafluorophenyl aluminum, diethylammonium tetrapentatetraphenyl aluminum, triphenylphosphonium tetraphenyl aluminum, trimethylphosphonium tetraphenyl aluminum, tripropylammonium tetra(p-tolyl)boron, triethylammonium tetra(o,p-dimethylphenyl)boron, tributylammonium tetra(p-trifluoromethylphenyl)boron, triphenylcarbonium tetra(p-trifluoromethylphenyl)boron, triphenylcarbonium tetrapentafluorophenylboron, or the like, and a mixture of any one or two or more among them may be used.

When the cocatalyst as described above is further included, a weight ratio of the compound of Chemical Formula 1 to the cocatalyst may be 1:1 to 1:20. When the cocatalyst and the compound of Chemical Formula 1 are included at the weight ratio, appropriate supported catalytic activity is represented, thereby being advantageous in terms of catalytic activity maintenance and economic feasibility. More specifically, the weight ratio of the compound of Chemical Formula 1 to the cocatalyst may be 1:5 to 1:20, and more specifically 1:5 to 1:15.

When the catalyst composition includes both the carrier and the cocatalyst, the catalyst composition may be prepared by a preparation method including a step of supporting the cocatalyst compound by the carrier, and a step of supporting the compound of Chemical Formula 1 by the carrier, wherein the order of supporting the cocatalyst and the compound of Chemical Formula 1 may be changed, if necessary.

Here, as a reaction solvent used when preparing the catalyst composition, a hydrocarbon-based solvent such as pentane, hexane, and heptane, or an aromatic solvent such as benzene and toluene, may be used.

Meanwhile, in a preparation method of homopolypropylene according to an embodiment of the present invention, the polymerization process may be performed by bringing the catalyst composition including the compound represented by Chemical Formula 1 and propylene into contact with each other under a hydrogen gas atmosphere.

Here, the hydrogen gas may be added at a content of 700 to 2500 ppm, with respect to the total weight of a propylene monomer. By adjusting an amount of hydrogen gas to be added, the molecular weight distribution and fluidity of the prepared homopolypropylene composition may be adjusted within a desired range while sufficient catalytic activity is represented, and accordingly, a homopropylene polymer having appropriate physical properties depending on the use may be prepared. When the amount of hydrogen gas to be added is less than 700 ppm, the MI of the prepared homopolypropylene is greatly lowered, whereby processability may be deteriorated, and when the amount is more than 2500 ppm, the MI is excessively high, whereby a strength property and a roughness property may be deteriorated during manufacture of a non-woven fabric. More specifically, the hydrogen gas may be added at a content of 700 ppm or more, 1500 ppm or more, or 1750 ppm or more, and 2500 ppm or less or 2000 ppm or less.

The polymerization process may be performed in a continuous polymerization process, and for example, various polymerization processes which are known for polymerization reaction of an olefin monomer such as a continuous solution polymerization process, a bulk polymerization process, a suspension polymerization process, a slurry polymerization process, or an emulsion polymerization process may be adopted. In particular, a continuous bulk-slurry polymerization process may be preferred, in terms of obtaining a uniform molecular weight distribution and commercially producing a product.

In addition, the polymerization reaction may be performed at a temperature of about 40 to 110° C. or about 60 to 100° C. under a pressure of about 1 to 100 kgf/cm$^2$.

In addition, in the polymerization reaction, the catalyst may be added in a state of being dissolved or diluted in a solvent such as pentane, hexane, heptane, nonane, decane, toluene, benzene, dichloromethane, and chlorobenzene. Here, by treating the solvent with a small amount of alkylaluminum or the like, a small amount of water or air which may have an adverse effect on the catalyst may be removed in advance.

The homopolypropylene according to an embodiment of the present invention, which is prepared by the preparation method as described above, has an MI in an optimal range and a narrow molecular weight distribution, together with a low residual stress ratio and content of xylene solubles, thereby manufacturing a fiber having a thin and uniform thickness, and also imparting rougher tactility than the existing products while simultaneously implementing excellent stiffness so that the fiber is not torn at high strength. Accordingly, the homopolypropylene may be useful for manufacture of a non-woven fabric requiring high surface roughness together with high stiffness, specifically non-woven fabric for washing such as a scrubber.

Therefore, according to another embodiment of the present invention, a resin composition for a non-woven fabric including the homopolypropylene and non-woven fabric manufactured using the composition are provided. Here, the non-woven fabric may be a non-woven fabric for washing such as a scrubber, and more specifically a disposable scrubber.

The resin composition for a non-woven fabric and the non-woven fabric may be prepared by a common method, while using the homopolypropylene.

Hereinafter, preferred examples are presented, for facilitating the understanding of the present invention. However, the following examples are only for illustrating the present invention, and the description of the present invention is not limited by the examples.

Preparation Example 1

Step 1) Preparation of (diethylsilane-diyl)-bis(2-methyl-4-(4-tert-butyl-phenyl)indenyl)silane 2-methyl-4-tert-butyl-phenylindene (20.0 g) was dissolved in a toluene/THF solution at a volume ratio=10/1 (220 mL), an n-butyllithium solution (2.5 M, a hexane solvent, 22.2 g) was slowly added dropwise thereto, and stirring was performed at room temperature for a day. To the resulted mixed solution, diethyldichlorosilane (6.2 g) was slowly added dropwise at −78° C., stirred for about 10 minutes, and further stirred at room temperature for a day. Thereafter, water was added to separate an organic layer, and the solvent was distilled off under reduced pressure to obtain (diethylsilane-diyl)-bis(2-methyl-4-(4-tert-butyl-phenyl)indenyl)silane.

Step 2) Preparation of [(diethylsilane-diyl)-bis(2-methyl-4-(4-tert-butyl-phenyl)indenyl)]zirconium Dichloride (Diethylsilane-diyl)-bis(2-methyl-4-(4-tert-butyl-phenyl)indenyl)silane prepared in step 1 was dissolved in a toluene/THF solution at a volume ratio=5/1 (120 mL), an n-butyllithium solution (2.5 M, a hexane solvent, 22.2 g) was slowly added dropwise at −78° C., and stirring was performed at room temperature for a day. To the resulted reactant solution, a solution prepared by diluting zirconium chloride (8.9 g) in toluene (20 mL) was slowly added dropwise at −78° C., and stirred at room temperature for a day. From the resulted reactant solution, a solvent was removed under reduced pressure, dichloromethane was added, filtering was performed, and the filtrate was removed by distillation under reduced pressure. Recrystallization was performed using toluene and hexane to obtain high-purity rac-[(diethylsilane-diyl)-bis(2-methyl-4-(4-tert-butyl-phenyl)indenyl)]zirconium dichloride (10.1 g, a yield of 34%, a weight ratio of rac:meso=20:1).

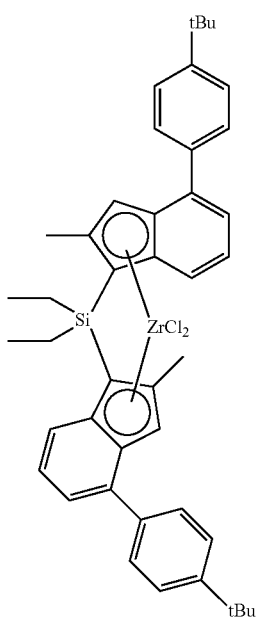

Step 3) Preparation of Supported Catalyst

To a 3 L reactor, 100 g of silica and 10 wt % of a methylaluminoxane solution (670 g, solvent: toluene) were added, and reacted at 90° C. for 24 hours. After the reaction was completed and precipitation was finished, an upper layer solution was removed, and a remaining reaction product was washed twice with toluene. As an ansa-metallocene compound prepared in step 2, 5.8 g of rac-[(diethylsilane-diyl)-bis(2-methyl-4-(4-tert-butyl-phenyl)indenyl)]zirconium dichloride was diluted with 500 ml of toluene, added to the reactor, and reacted at 70° C. for 5 hours. After the reaction was completed and precipitation was finished, an upper layer solution was removed, a remaining reaction product was washed with toluene, washed again with hexane, and dried in vacuo, thereby obtaining 150 g of a silica-supported metallocene catalyst in a solid particle form.

Preparation Example 2

A silica-supported metallocene catalyst was prepared in the same manner as in step 3 of Preparation Example 1, except that diethylsilandiyl(2-ethyl-4-(4'-tert-butyl-phenyl)-indenyl) (2-methyl-4-(4'-tert-butyl-phenyl)indenyl)zirconium dichloride was used, instead of the transition metal compound prepared in step 2 of Preparation Example 1.

Preparation Example 3

A silica-supported metallocene catalyst was prepared in the same manner as in step 3 of Preparation Example 1, except that dimethylsilanediyl bis(2-methylindenyl)zirconium dichloride) was used, instead of the transition metal compound prepared in step 2 of Preparation Example 1.

Preparation Example 4

A silica-supported metallocene catalyst was prepared in the same manner as in step 3 of Preparation Example 1, except that dimethylsilanediyl bis(2-methyl-4-(4-tert-butylphenyl)indenyl)zirconium dichloride was used, instead of the transition metal compound prepared in step 2 of Preparation Example 1.

Preparation Example 5

A silica-supported metallocene catalyst was prepared in the same manner as in step 3 of Preparation Example 1, except that compound (I) of the following structure was used, instead of the transition metal compound prepared in step 2 of Preparation Example 1.

Example 1

Bulk-slurry polymerization of propylene was carried out using continuous two loop reactors, in the presence of the silica-supported metallocene catalyst prepared in Preparation Example 1.

Here, triethylaluminum (TEAL) and hydrogen gas were added using a pump, respectively, at the content described in the following Table 1, and for bulk-slurry polymerization, the supported catalyst prepared according to Preparation Example 1 was used in a mud catalyst form mixed with oil and greases to be a content of 30 wt %. The temperature of the reactor was 70° C., and operation was performed so that an hourly output was about 40 kg.

The specific reaction conditions for the polymerization process of Example 1 are as shown in the following Table 1, and by the polymerization process, a homopolypropylene was prepared.

Examples 2 to 5

A homopolypropylene was prepared in the same manner as in Example 1, except under the conditions described in Table 1.

Comparative Example 1

As a Z/N homopolypropylene, commercially available H7910® (manufactured by LG Chem.) was used.

Comparative Examples 2 to 4

A homopolypropylene was prepared in the same manner as in Example 1, except under the conditions described in Table 1.

Comparative Example 5

A homopolypropylene was prepared in the same manner as in Example 1, except that 500 ppm of hydrogen was added.

Comparative Example 6

A homopolypropylene was prepared in the same manner as in Example 1, except that 3000 ppm of hydrogen was added.

Comparative Example 7

A homopolypropylene was prepared in the same manner as in Example 1, except that the silica-supported metallocene catalyst prepared in Preparation Example 5 was used, and the conditions described in Table 1 were used.

and IP (inlet pressure through bridge top to bottom) were stabilized, a concentration of the pretreated sample and an injection amount were recorded and measurement was performed, and then a peak area was calculated.

(3) Melting Point (Tm, ° C.)

The temperature of the homopolypropylene to be measured was increased to 200° C., maintained at that temperature for 5 minutes, decreased to 30° C., and then increased again, and a peak of a differential scanning calorimeter (DSC, manufactured by TA Instruments) curve was determined as a melting point. Here, a temperature increase rate and a temperature decrease rate were 10° C./min, and as the melting point, a result measured at a second temperature increase section was used.

(4) Molecular weight distribution (MWD, polydispersity index) of polymer: a molecular weight ("Mw/Mn") was determined as a ratio of Mw/Mn after measuring Mw and Mn using gel permeation chromatography (GPC). Specifically, a Waters PL-GPC220 instrument using a PLgel Mixed-B column of a 300 mm length from Polymer Laboratories was used for measurement. Here, the evaluation temperature was 160° C., 1,2,4-trichlorobenzene was used as a solvent, and a flow rate was 1 mL/min. A sample was

TABLE 1

| | Example | | | | | Comparative Example | | | | | | |
|---|---|---|---|---|---|---|---|---|---|---|---|---|
| | 1 | 2 | 3 | 4 | 5 | 1 | 2 | 3 | 4 | 5 | 6 | 7 |
| Catalyst | Preparation Example 1 | Preparation Example 1 | Preparation Example 1 | Preparation Example 1 | Preparation Example 1 | Z/N catalyst | Preparation Example 2 | Preparation Example 3 | Preparation Example 4 | Preparation Example 1 | Preparation Example 1 | Preparation Example 5 |
| Amount of catalyst (wt %) | 30 | 30 | 30 | 30 | 30 | 30 | 30 | 30 | 30 | 30 | 30 | 30 |
| Pressure (kg/cm$^2$) | 35 | 35 | 35 | 35 | 35 | — | 35 | 35 | 35 | 35 | 35 | 35 |
| Added amount of propylene (kg/h) | 40 | 40 | 40 | 40 | 40 | — | 40 | 40 | 40 | 40 | 40 | 40 |
| Added amount of TEAL (ppm) | 50 | 50 | 50 | 50 | 50 | — | 50 | 50 | 50 | 50 | 50 | 50 |
| Polymerization temperature (° C.) | 70 | 70 | 70 | 70 | 70 | — | 70 | 70 | 70 | 70 | 70 | 70 |
| Added amount of hydrogen (ppm) | 700 | 1500 | 1750 | 2000 | 2500 | — | 550 | 290 | 1400 | 500 | 3000 | 1500 |

Experimental Example 1

For the homopolypropylenes prepared in the examples and the comparative examples, evaluation of physical properties was performed by the following methods. The results are shown in the following Table 2.

(1) Melt index (MI, g/10 min): measured at 230° C. under a load of 2.16 kg according to ASTM D1238, and represented as a weight (g) of a polymer which was melted out for 10 minutes.

(2) Xylene solubles (wt %): xylene was added to each sample of homopolypropylenes, and pretreated by heating at 135° C. for 1 hour and cooling for 30 minutes. Xylene was flowed at a flow rate of 1 mL/min for 4 hours in OmniSec equipment (FIPA from Viscotek), and when base lines of RI (refractive index), DP (pressure across middle of bridge), prepared at a concentration of 10 mg/10 mL, and supplied in an amount of 200 μL. A calibrated curve formed using a polystyrene standard was used to derive Mw and Mn values. As the molecular weight (g/mol) of the polystyrene standard, nine types of 2000/10,000/30,000/70,000/200,000/700,000/2,000,000/4,000,000/10,000,000 were used.

(5) Measurement of Residual Stress Ratio

Each sample was taken from the homopolypropylenes according to the examples and the comparative examples, a strain at 200% were applied to each sample at 235° C., and a change in residual stress for 10 minutes was measured.

For the measurement of residual stress, a Discovery Hybrid Rheometer (DHR) from TA Instruments was used, and a sample was sufficiently loaded between upper and lower plates having a diameter of 25 mm, dissolved at 235° C., a gap was fixed at 1 mm, and measurement was performed.

Based on the data of the measured residual stress, a ratio of the residual stress (RS %) was calculated according to the following Equation 1, and the results are shown in the following Table 2:

$$\text{Residual stress ratio }(Y)=(RS_1/RS_0)*100 \quad\quad \text{[Equation 1]}$$

wherein $RS_0$ is residual stress at 0.02 seconds ($t_0$) after applying a strain at 200% to a sample at 235° C., and $RS_1$ is residual stress at 1.00 second ($t_1$) after applying a strain at 200% to a sample at 235° C.

TABLE 2

|  | Example | | | | | Comparative Example | | | | | | |
| --- | --- | --- | --- | --- | --- | --- | --- | --- | --- | --- | --- | --- |
|  | 1 | 2 | 3 | 4 | 5 | 1 | 2 | 3 | 4 | 5 | 6 | 7 |
| MI (g/10 min) | 220 | 450 | 800 | 1100 | 1500 | 950 | 200 | 210 | 220 | 140 | 2400 | 480 |
| Xylene solubles (wt %) | 0.6 | 0.6 | 0.6 | 0.7 | 0.7 | 2.2 | 0.6 | 1.5 | 0.6 | 0.6 | 0.8 | 0.7 |
| Tm (° C.) | 154 | 154 | 154 | 154 | 154 | 162 | 152 | 155 | 153 | 154 | 155 | 154 |
| MWD | 3.0 | 3.1 | 3.1 | 3.2 | 3.3 | 4.1 | 3.1 | 4.7 | 4.0 | 3.0 | 3.4 | 3.4 |
| Residual stress ratio (%) | 0.03 | 0.03 | 0.02 | 0.03 | 0.02 | 0.15 | 0.3 | 0.4 | 0.20 | 0.04 | 0.02 | 0.08 |

As a result of experiments, the homopolypropylenes of Examples 1 to 5 prepared by the preparation method according to the present invention had a low content of xylene solubles and a low residual stress ratio, together with narrow MWD and MI in a range of 200 to 2000 g/10 min, and the MI was increased with an increase of an added amount of hydrogen. In addition, the homopolypropylenes of Examples 1 to 5 represented significantly decreased xylene solubles and residual stress ratio, and had a significantly narrow molecular weight distribution, as compared with the homopolypropylene of Comparative Example 1 prepared using a Ziegler-Natta catalyst.

In addition, in Comparative Examples 2 to 4 using the compound having a different structure as a catalytic active material, due to a difference in hydrogen reactivity depending on a difference in catalyst structure, added amounts of hydrogen required for preparation of a polymer having equivalent MI were different from each other, however the molecular weight distribution was increased and the residual stress ratio was greatly increased, as compared with Example 1 having an equivalent MI. In addition, in Comparative Example 7 using the compound having an identical ligand structure but containing a tether group of alkoxyalkyl as a bridge group connecting two ligands, high MWD and residual stress ratio were represented. Deteriorated processability was confirmed therefrom.

In addition, when an identical catalyst was used but the condition of the added amount of hydrogen was not satisfied, the melt index was excessively low or high as in Comparative Examples 5 and 6, thereby confirming deteriorated processability.

Experimental Example 2

<Manufacture of Non-Woven Fabric>

A melt blowing process was performed using resin compositions including homopolypropylene according to the examples and the comparative examples, thereby manufacturing spunbond non-woven fabric.

Specifically, a 25 mm twin-screw extruder was used to manufacture a master batch including homopolypropylenes according to the examples and the comparative examples, and 2000 ppm of Irganox 1010™ and 2000 ppm of Irgafos 168™ as an antioxidant, which was then pelletized. Subsequently, the master batch pellets were extruded into an extra fine fiber web by a process similar to that described in a reference [Report No. 4364 of the Naval Research Laboratories, published May 25, 1954 entitled "Manufacture of Superfine Organic Fibers" by Wente, V. A., Boone, C. D., and Fluharty, E. L.], except that a 31 mm Brabender conical twin screw extruder was used to supply the melted master batch composition to a melt pump (65 rpm), and then to a melt blowing die of a width of 25 cm having an outlet (10 outlets/cm) having an outlet diameter of 381 μm.

The melting temperature was 235° C., the screw speed was 120 rpm, the die was maintained at 235° C. primary air temperature and pressure were 300° C. and 60 kPa (8.7 psi), respectively, a polymer treatment speed was 5.44 kg/h, and a distance of collector/die was 15.2 cm.

<Evaluation of Physical Properties of Non-Woven Fabric>

For each spunbond non-woven fabric manufactured using the homopolypropylenes according to the examples and the comparative examples, evaluation of physical properties was performed as follows, and the results are shown in the following Table 3.

(1) Weight of Non-Woven Fabric (gsm)

A weight of the manufactured non-woven fabric was measured, and a weight of the non-woven fabric per unit area was calculated.

(2) Processability of Non-Woven Fabric

It was confirmed whether a single yarn of fiber occurred when manufacturing the non-woven fabric, and the processability of the non-woven fabric was evaluated according to the following criteria.

<Evaluation Criteria>

Good: an occurrence rate of a single yarn of fiber was 10% or less, that is, a time during which fiber was not produced due to occurrence of a single yarn was 2.4 hours or less, based on 24 hours to produce fiber.

Poor: an occurrence rate of a single yarn of fiber was more than 10%, that is, a time during which fiber was not produced due to occurrence of a single yarn was more than 2.4 hours, based on 24 hours to produce fiber.

(3) Strength of Non-Woven Fabric

Strength (N/5 cm) in a machine direction (MD) and strength in a cross direction (CD) were measured by a cut-strip method of a width of 5 cm, according to a method of ASTM (American Society for Testing and Materials) D 5035:2011 (2015).

(4) Roughness of Non-Woven Fabric

The roughness of the non-woven fabric was measured by a blind panel evaluation of 10 people, and evaluated by the following criteria:

<Evaluation Criteria>

◎: determined to be excellent when 7 or more people evaluated the non-woven fabric tactility as being rough ○: determined to be good when 4 to 6 people evaluated the non-woven fabric tactility as being rough Δ: determined to be normal when 2 or 3 people evaluated the non-woven fabric tactility as being rough x: determined to be poor when one or fewer persons evaluated the non-woven fabric tactility as being rough

TABLE 3

|  | Example | | | | | Comparative Example | | | | | | |
| --- | --- | --- | --- | --- | --- | --- | --- | --- | --- | --- | --- | --- |
|  | 1 | 2 | 3 | 4 | 5 | 1 | 2 | 3 | 4 | 5 | 6 | 7 |
| Weight of non-woven fabric (gsm) | 37 | 38 | 36 | 37 | 36 | 40 | 41 | 40 | 39 | 38 | 39 | 38 |
| Processability | Good | Good | Good | Good | Good | Poor | Poor | Poor | Poor | Poor | Good | Poor |
| Strength (MD/CD, N/5 cm) | 22/15 | 20/13 | 17/12 | 15/11 | 14/11 | 10/8 | 11/8 | 11/6 | 11/8 | 24/15 | 12/9 | 16/10 |
| Roughness | ◎ | ◎ | ◎ | ◎ | ◎ | Δ | ◎ | ○ | ◎ | ◎ | ○ | ◎ |

According to an embodiment of the present invention, the non-woven fabric manufactured using the homopolypropylenes of Examples 1 to 5 in which MI, MWD, xylene solubles, and residual stress ratios were all optimized, represented high strength and roughness, together with excellent processability. Moreover, it was found that from the high roughness property of the homopolypropylenes according to Examples 1 to 5, the non-woven fabric for washing requiring a high roughness property may be manufactured, with only primary processing without blending with an additive.

Meanwhile, in Comparative Example 1 in which the homopolypropylene was prepared using a Ziegler-Natta catalyst, processability was poor, and strength and roughness properties were greatly deteriorated, as compared with Examples 1 to 5. In particular, it was found that in order to manufacture a non-woven fabric for washing using the homopolypropylene prepared according to Comparative Example 1, due to the low roughness property, blending with an additive for increasing the roughness property and a secondary processing are essential.

In addition, in Comparative Examples 2 to 4 in which compounds having different structures were used as a catalytic active material, due to a higher residual stress ratio than that of Example 1 having an identical MI, poor processability was represented, and as a result, web formation was poor, whereby strength deterioration occurred.

In addition, in Comparative Example 5 in which an identical catalyst was used, but the added amount of hydrogen was out of the range of the added amount condition of hydrogen and was excessively low, the MI value was lowered to less than 200 g/10 min, thereby representing poor processability. However, in Comparative Example 6 in which the added amount of hydrogen was excessively high, due to an MI of more than 2000 g/10 min, a lowered roughness property was represented, and also due to high MWD of more than 3.3 and increased xylene solubles, the strength property was also lowered as compared with the examples.

In addition, in Comparative Example 7 having an identical ligand structure, but using a compound containing a tether group of alkoxyalkyl as a bridge group connecting two ligands, the prepared homopolypropylene had high MWD and residual stress, thereby representing poor processability. From the results, it was confirmed that for implementing homopolypropylene satisfying the requirements of physical properties according to the present invention, the transition metal compound having the structure of Chemical Formula 1 is preferred.

The invention claimed is:

1. A homopolypropylene satisfying the following conditions:
   i) a melt index of 200 to 2000 g/10 min as measured at 230° C. under a load of 2.16 kg according to ASTM D12384,
   ii) a molecular weight distribution of 3.3 or less,
   iii) a residual stress ratio of 0.05% or less, and
   iv) a content of xylene solubles of 1.0 wt % or less.

2. The homopolypropylene of claim 1, wherein the homopolypropylene has a molecular weight distribution of 2.5 to 3.3.

3. The homopolypropylene of claim 1, wherein the homopolypropylene has a residual stress ratio of 0.02 to 0.03%.

4. The homopolypropylene of claim 1, wherein the homopolypropylene has a content of xylene solubles of 0.6 to 0.7 wt %.

5. The homopolypropylene of claim 1, wherein the homopolypropylene has a melting point of 150 to 155° C.

6. A preparation method of the homopolypropylene of claim 1, comprising adding 700 to 2500 ppm of hydrogen, in the presence of a catalyst composition including a compound of the following Chemical Formula 1 to polymerize a propylene monomer:

[Chemical Formula 1]

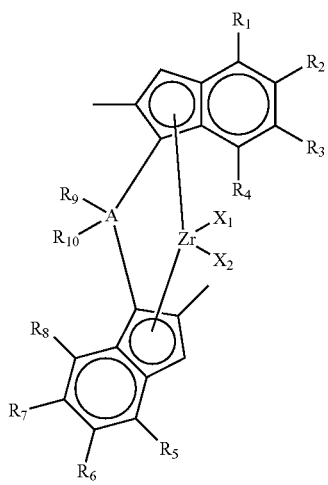

wherein

A is carbon, silicon, or germanium, $X_1$ and $X_2$ are independently a halogen, $R_1$ and $R_5$ are independently a $C_{6-20}$ aryl substituted with a $C_{1-20}$ alkyl, $R_2$ to $R_4$ and $R_6$ to $R_8$ are independently hydrogen, a halogen, a $C_{1-20}$ alkyl, a $C_{2-20}$ alkenyl, a $C_{1-20}$ alkylsilyl, a $C_{1-20}$ silylalkyl, a $C_{1-20}$ alkoxysilyl, a $C_{1-20}$ ether, a $C_{1-20}$ silyl ether, a $C_{1-20}$ alkoxy, a $C_{6-20}$ aryl, a $C_{7-20}$ alkylaryl, or a $C_{7-20}$ arylalkyl, and $R_9$ and $R_{10}$ are identical to each other and are a $C_{2-20}$ alkyl.

7. The preparation method of claim 6, wherein A is silicon.

8. The preparation method of claim 6, wherein $R_1$ and $R_5$ are independently a phenyl group substituted with a $C_{3-6}$ branched alkyl group.

9. The preparation method of claim 6, wherein $R_9$ and $R_{10}$ are identical to each other and are a $C_{2-4}$ linear alkyl group.

10. The preparation method of claim 6, wherein $R_9$ and $R_{10}$ are ethyl, respectively.

11. The preparation method of claim 6, wherein the compound of Chemical Formula 1 is represented by the following Chemical Formula 1a:

[Chemical Formula 1a]

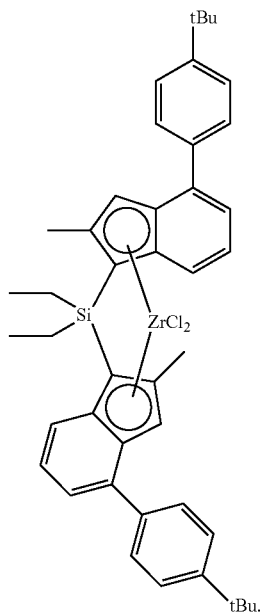

12. The preparation method of claim 6, wherein the compound of Chemical Formula 1 is supported by a carrier.

13. The preparation method of claim 6, wherein the catalyst composition further includes one or more of a compound represented by the following Chemical Formula 2, a compound represented by the following Chemical Formula 3, and a compound represented by the following Chemical Formula 4:

$$—[Al(R_{11})—O]_m—$$ [Chemical Formula 2]

wherein each $R_{11}$ is identical to or different from each other and is independently a halogen, a $C_{1-20}$ hydrocarbon, or a $C_{1-20}$ hydrocarbon substituted with a halogen, and m is an integer of 2 or more;

$$J(R_{12})_3$$ [Chemical Formula 3]

wherein each $R_{12}$ is identical to or different from each other and is independently a halogen, a $C_{1-20}$ hydrocarbon, or a $C_{1-20}$ hydrocarbon substituted with a halogen, and J is aluminum or boron; and $$[E–H]^+[ZQ_4]^- \text{ or } [E]^+[ZQ_4]^-$$ [Chemical Formula 4]

wherein

E is a neutral or cationic Lewis base,

H is a hydrogen atom,

Z is a Group 13 element, and each Q is identical to or different from each other and is independently a $C_{6-20}$ aryl group or a $C_{1-20}$ alkyl group in which one or more hydrogen atoms are unsubstituted or substituted with a halogen, a $C_{1-20}$ hydrocarbon, an alkoxy, or a phenoxy.

14. A non-woven fabric for washing, comprising the homopolypropylene of claim 1.

* * * * *